United States Patent [19]
Bambacigno

[11] Patent Number: 5,425,466
[45] Date of Patent: Jun. 20, 1995

[54] COMBINATION MANWAY COVER AND EMERGENCY PRESSURE RELIEF APPARATUS

[75] Inventor: Ralph Bambacigno, Modesto, Calif.
[73] Assignee: Convault, Inc., Denair, Calif.
[21] Appl. No.: 198,660
[22] Filed: Feb. 22, 1994

Related U.S. Application Data

[63] Continuation of Ser. No. 981,027, Nov. 24, 1992, abandoned.

[51] Int. Cl.⁶ ............................................. B65D 51/16
[52] U.S. Cl. ............................ 220/203.09; 220/89.1; 220/328; 220/366.1
[58] Field of Search .................. 220/203, 208, 89.1, 220/328, 366, 582

[56] References Cited

U.S. PATENT DOCUMENTS

| | | |
|---|---|---|
| 1,343,480 | 6/1920 | Rutherford ................... 220/208 X |
| 1,459,817 | 6/1923 | Bingay ............................ 220/89.1 |
| 1,889,606 | 11/1932 | Lang . |
| 2,014,861 | 9/1935 | Neely . |
| 2,760,673 | 8/1956 | Laurent . |
| 2,781,943 | 2/1957 | Carlstrom . |
| 3,266,657 | 8/1966 | Stachiw . |
| 3,848,765 | 11/1974 | Dürkop . |
| 4,685,585 | 8/1987 | Robbins . |
| 4,820,384 | 4/1989 | Pechacek . |
| 4,875,595 | 10/1989 | Van Valkenburg ............... 220/1.5 |
| 5,092,483 | 3/1992 | McKelvy ..................... 220/203 X |
| 5,191,991 | 3/1993 | Jackson ........................ 220/203 X |

OTHER PUBLICATIONS

*Oil Equipment Fittings Catalog No. 80,* Storage Tank Vents, p. 18, Clay and Bailey Mfg. Co., Kansas City, Mo.

Primary Examiner—Allan N. Shoap
Assistant Examiner—Stephen Cronin
Attorney, Agent, or Firm—Townsend & Townsend Khourie & Crew

[57] ABSTRACT

A combination manway cover and pressure relief apparatus (2) for a tank (4) having a manway opening (14) and containing a fluid. A body (12) covers the manway opening and is guided and biased along a substantially vertical, linear path (16). The body is guided along the path by bolts (18) which pass through a plurality body, gasket and flange bolt holes (22, 23, 24). The weight of the body biases the body along the path toward the manway opening. Pressure relief for the tank is provided when the fluid pressure within the tank moves the body away from the manway opening.

9 Claims, 2 Drawing Sheets

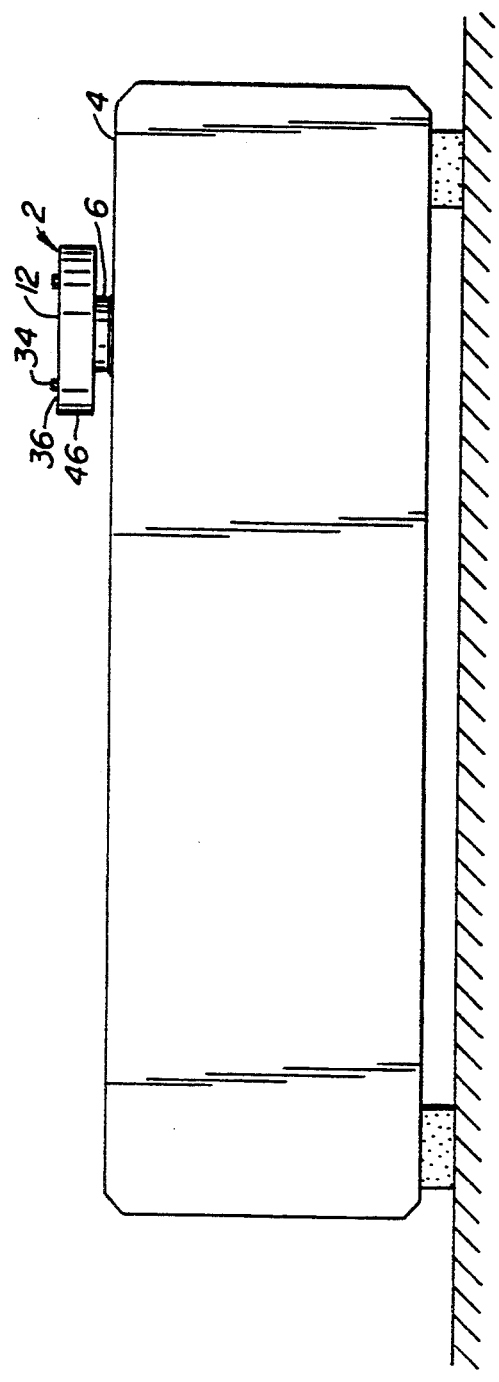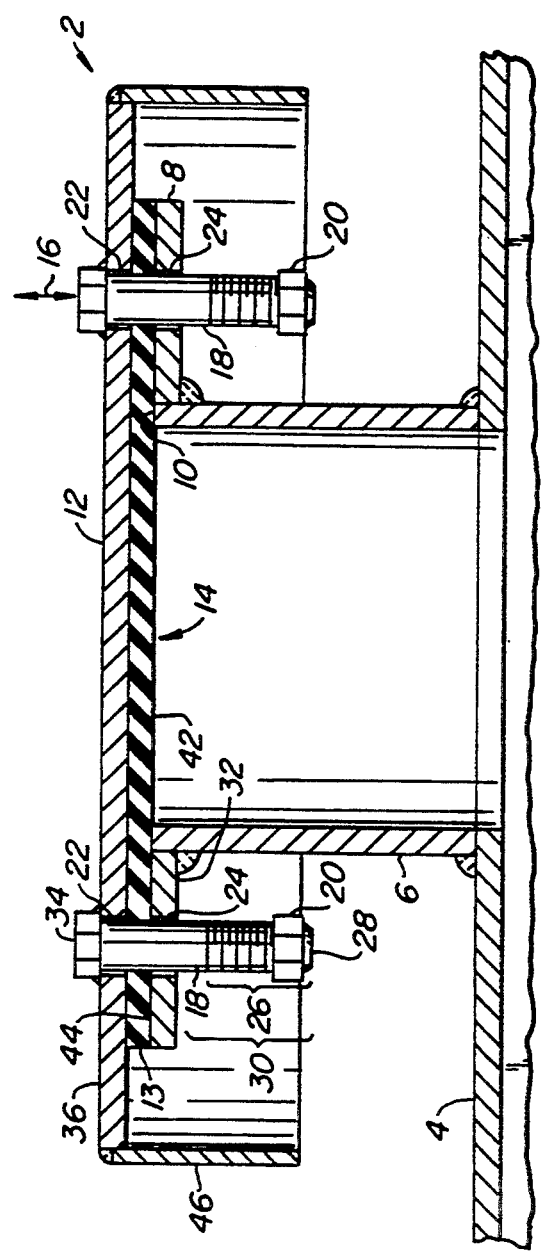

COMBINATION MANWAY COVER AND EMERGENCY PRESSURE RELIEF APPARATUS

This is a Continuation of application Ser. No. 07/981,027, filed Nov. 21, 1992, now abandoned.

BACKGROUND OF THE INVENTION

The present invention relates to the field of manway covers and emergency pressure relief apparatus for tanks. Industrial tanks often store volatile fluids or gasses and therefore must be substantially vapor tight. Manways are provided for entry of personnel into the tank for cleaning and inspection. The manway is covered during normal operation with a manway cover to prevent the stored contents from escaping. Known manway covers are secured to the tank with nuts and bolts.

Tanks also often include pressure relief apparatus for relieving pressure in the tank. Pressure buildup can result from overpressure delivered by charging devices, such as pumps or compressors, or may result from increased temperature during an emergency event, such as a fire. It is necessary to limit the amount of pressurization within a tank; an excessively high pressure could result in the tank exploding with disastrous consequences. Conventional pressure relief valves are mounted to a pressure relief vent pipe extending from the tank interior to prevent excessive pressure build-up.

SUMMARY OF THE INVENTION

The present invention provides a combination manway cover and pressure relief apparatus as a single unit. This eliminates the need for a separate pressure relief apparatus and the associated vent pipe.

The combination manway cover and pressure relief apparatus includes a body sized to cover the manway opening at the upper end of the manway tube of the tank.

The body includes structure for guiding the body along a path towards and away from the upper end of the manway tube. The body seals the upper end when it is at a sealed position resting against the upper end and opens a fluid pathway when it is at a vent position spaced apart from the upper end. In the preferred embodiment bolts are used to guide the body in a substantially vertical, linear path. Preferably, both a flange of the tank and the body include a plurality of bolt holes through which bolts pass. The bolt heads may be secured, such as by welding, to the body preventing removal of the bolts and facilitating installation and removal of the nuts.

The body is also biased toward the sealed position at one end of the path. Preferably, the weight of the body acts as all or a substantial portion of the biasing mechanism. Other biasing mechanisms, such as a spring or a cantilever arm, could be used in addition to or instead of the weight of the body.

Pressure relief is provided when the pressure force exerted on the body exceeds the biasing force causing the body to lift off the manway opening from the sealed position toward the vent position. By selecting an appropriate biasing mechanism (typically, just the weight of the body), and manway opening size, the body will lift from the manway opening at a predetermined pressure of the fluid. In the preferred embodiment, wherein the biasing force is the weight of the body, the body moves away from the manway opening when the pressure force exerted on the body exceeds the weight of the body.

The bolts are preferably threaded a thread length which is smaller than a thread distance necessary to lock a nut to the bottom of the tank flange. The threads are cut in such a manner to ensure that the nuts cannot be locked thereby permitting the body to move away from the manway opening.

The problem of manway covers having nuts and bolts which are easily tampered with is overcome in accordance with the present invention by providing a guard extending from a bottom side of the manway cover. The guard extends downwardly from the body to a position generally aligned with or somewhat below the ends of the bolts. This prevents tampering with the bolts using a conventional wrench. A special wrench, which wraps around the guard, is used to tighten and loosen the nuts. The guard also helps to keep rain away from the joint between the body and the upper end of the manway tube.

Other features and advantages of the present invention will appear from the following description in which the preferred embodiment has been set forth in detail in conjunction with the accompanying drawings.

BRIEF DESCRIPTION OF THE DRAWINGS

FIG. 1 is a side view of a tank with a combination manway cover and pressure relief apparatus covering a manway opening;

FIG. 2 is a cross-section view of the combination manway cover and pressure relief apparatus in the sealing position covering the manway opening.

DESCRIPTION OF THE PREFERRED EMBODIMENT

Figure 3:
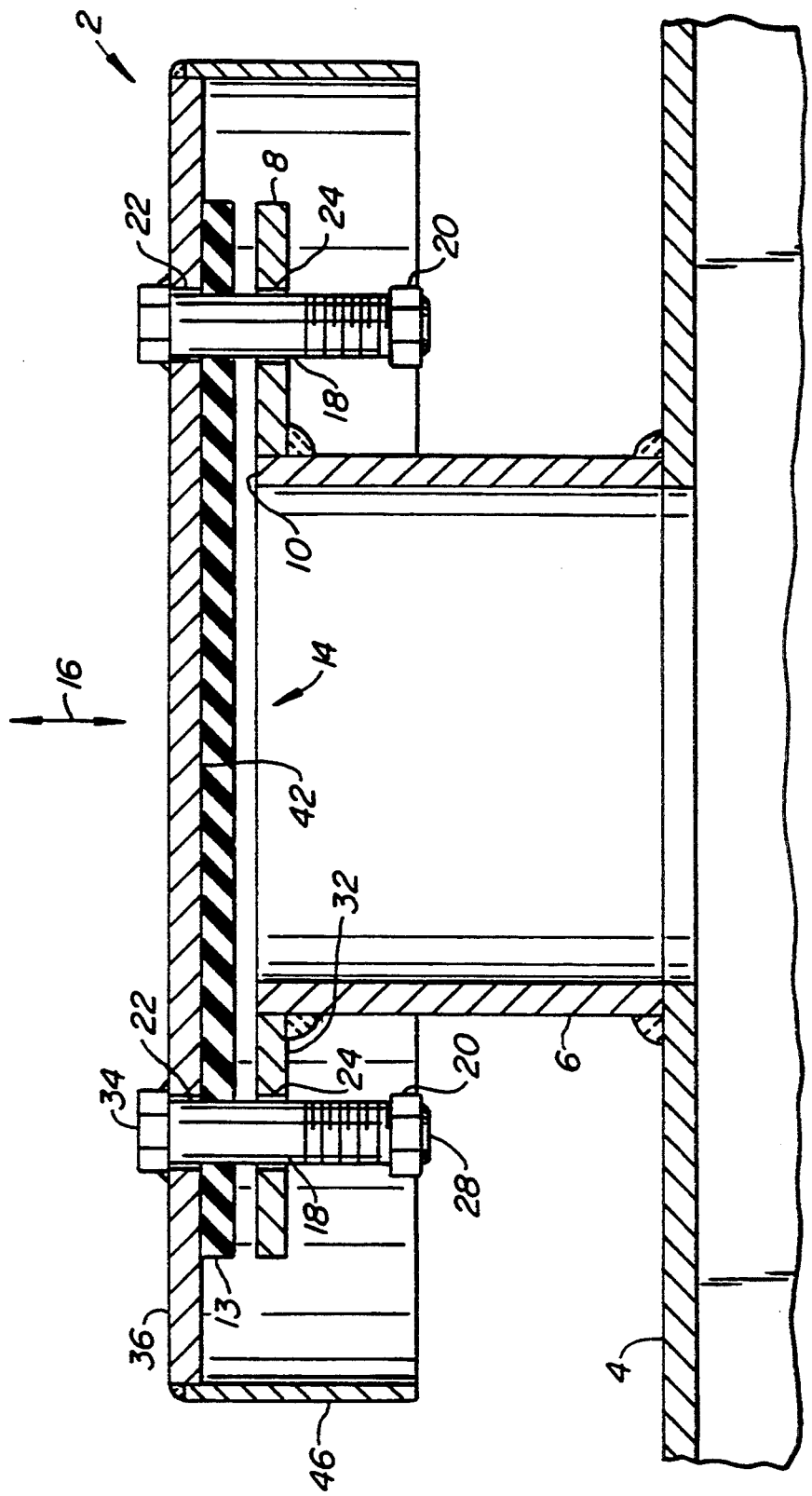
FIG. 3 is a cross-section view of the combination manway cover and pressure relief apparatus in the vent position separated from the manway opening providing pressure relief for the tank.

FIG. 1 illustrates a combination manway cover and pressure relief apparatus 2 for a tank 4. Tank 4 includes a manway tube 6.

FIG. 2 illustrates a side cross-section view of the combination manway cover and pressure relief apparatus 2 supported by manway tube 6. Manway tube 6 includes a flange 8 at an upper end 10. Apparatus 2 includes a body 12 and a gasket 13 which rests on flange 8 and sealingly supports body 12 on upper end 10. Gasket 13 improves mating and sealing between body 12 and flange 8.

Upper end 10 defines a manway opening 14. Manway tube 6 is sized to permit entry of personnel into tank 4 and preferably has an 18"–24" diameter. Manway tube 6 may take any shape with the preferred shape being cylindrical. Manway tube 6 does not have to extend any significant height and may, in fact, be nearly flush with tank 4.

Body 12 is guided along a path 16 which leads both toward and away from manway opening 14 between the sealing position of FIG. 2 and the vent position of FIG. 3. Body 12 separates from manway opening 14 by its movement along path 16 towards the vent position to provide pressure relief for tank 4. In the preferred embodiment of FIG. 2 path 16 is linear and vertical. Path 16 may take any other shape including curved, circular, or arcuate so long as path 16 leads to and from manway opening 14.

Body 12 is guided along path 16 in the preferred embodiment of FIG. 2 using a number of bolts 18 and nuts 20. Bolts 18 and nuts 20 extend through body, gasket and flange bolt holes 22, 23, 24. The orientation of bolts 18 define a substantially linear, vertical path 16 along which body 12 moves. Using bolts 18 and nuts 20 with corresponding holes 22, 23, 24 is preferred since the arrangement can be used with tanks fitted for conventional manway covers.

Various other equivalent cover guides could also be used. One such equivalent guiding mechanism for guiding body 12 along a linear, vertical path 16 includes vertical slots on tank 4 and vertical tabs on body 12 with the vertical slots guiding the tabs in a generally linear, vertical path 16. Another equivalent guiding mechanism includes vertical guides on tank 4 adjacent a sidewall of body 12. Yet another mechanism for guiding body 12 along a circular path includes a hinged connection between body 12 and tank 4.

Body 12 is biased along path 16 towards the sealing position by substantially only the weight of body 12. Thus, body 12 lifts vertically off manway opening 14 when the pressure force exerted on body 12 by the fluid in the tank exceeds the weight of body 12.

Body 12 provides pressure relief for tank 4 by separating from tank 4 at a predetermined pressure of fluid (gas or liquid) contained in tank 4. Separation of body 12 from tank 4 permits pressurized fluid to escape thereby relieving pressure buildup in tank 4. As noted above, preferably substantially only the weight of body 12 resists separation of body 12 from upper end 10 of manway tube 6. Pressure relief at the predetermined pressure is obtained by selecting an appropriate weight of body 12 and size of manway opening 14.

In some cases, the weight of body 12 may be too great or too little to achieve the proper pressure relief. Other biasing mechanisms may bias body 12 either toward or away form manway opening 14 along path 16. One such equivalent biasing mechanism is a cantilevered arm having a fixed end supported on tank 4 and a free end extending over body 12. The cantilever arm resists lifting of body 12 from manway opening 14. The cantilever arm may also be slidable for variable resistance and therefore variable pressure relief. One or more springs may be used to bias body 12 either toward or away from manway opening 14. The spring arrangement may also be adjustable for varying resistance or assistance in lifting body 12 from manway opening 14.

FIG. 3 shows body 12 separated from upper end 10 opening a fluid pathway for pressure relief. To ensure that body 12 is able to lift from manway opening 14, bolts 18 are threaded only a thread length 26 from a threaded end 28 as shown in FIG. 2. Thread length 26 is smaller than a thread distance 30 necessary to lock nut 20 to a bottom surface 32 of flange 8. In this manner nuts 20 cannot be locked to bottom surface 32 of flange 8 so that body 12 can lift from manway opening 14. Nuts 20 also ensure that body 12 cannot completely separate from tank 4. If bolts 18 did not have nuts 20 limiting the distance body 12 can move, body 12 could pop off tank 4 during a sudden increase in pressure presenting a significant hazard to nearby personnel.

Preferably, bolts 18 are secured to body 12. FIG. 2 shows a bolt head 34 seal welded to an upper side 36 of body 12. Body 12 also has a lower side 42 positioned adjacent gasket 13. Gasket 13 is preferably not sticky since additional adhesion between gasket 13 and a top surface 44 of flange 8 can affect the predetermined relief pressure.

Combination manway cover and pressure relief apparatus 2 also includes a guard 46 as shown in FIG. 2. Guard 46 prevents easy tampering with bolts 18 and nuts 20 using a conventional wrench. Guard 46 extends downwardly from an outer circumference of body 12 toward tank 4. Guard 46 preferably extends substantially vertically but could be secured to body 12 in an angular orientation. Guard 46 preferably extends at least as far as threaded end 30 to prevent access to nuts 20 using a conventional open-ended wrench. Guard 46 also helps to keep rain away from manway opening 14. Guard 40 may also be used with conventional manway covers.

Modification and variation can be made to the disclosed embodiment without departing from the subject of the invention as defined by the following claims. For example, guard 46 could be used for guiding body 12 if positioned adjacent flange 8.

What is claimed is:

1. A combination manway cover and pressure relief apparatus for a tank containing a pressurized gas, the tank having a manway defined by an upwardly extending manway tube, the manway tube including an upper end defining a manway opening, the combination manway cover and pressure relief apparatus comprising:
   a tank containing a pressurized gas, the tank including a vertically extending manway tube having an upper end defining a manway opening;
   a body having a weight and being sized to cover the manway opening, the body having a lower side, positioned adjacent the upper end, and an upper side opposite the lower side;
   means for guiding the body along a path towards and away from the upper end; and
   means for coupling the body to the tank so that movement of the body along the path is resisted by substantially only the weight of the body, the body being restrained by the tank in all directions except along the path, said coupling means providing a substantially constant relief pressure during first and second movements of the body along the path, the coupling means comprising a plurality of bolts having a lower bolt end; and
   a guard having a lower guard end extending downwardly at least as far as the lower bolt end, the lower guard end being disposed at a radially outward position relative to the plurality of bolts such that the lower guard end circumferentially surrounds the plurality of bolts.

2. The combination manway cover and pressure relief apparatus of claim 1 wherein the path is a substantially linear, substantially vertical path.

3. The combination manway cover and pressure relief apparatus of claim 1 wherein: the plurality of bolts further comprise bolt heads secured to the top surface of the body.

4. The apparatus of claim 1 further comprising a flange secured to and extending radially outwardly from the upper end of the manway tube, the flange having a bottom surface facing the tank and a top surface opposite the bottom surface.

5. The combination manway cover and pressure relief apparatus of claim 4 further comprising a gasket positioned between the lower side of the body and the top surface of the flange.

6. The combination manway cover and pressure relief apparatus of claim 4 wherein the body includes a plurality of body bolt holes and the flange includes a plurality of flange bolt holes.

7. The combination manway cover and pressure relief apparatus of claim 6 wherein: the plurality of bolts extend through the plurality of bolt holes and plurality of flange bolt holes for guiding the body along the path.

8. The combination manway cover and pressure relief apparatus of claim 7 wherein: the guiding means further comprises a plurality of nuts threadably coupled to the plurality of bolts, the plurality of bolts being threaded for a thread length from the lower end of the bolt, the thread length being sized small enough so that when the body is positioned over the manway opening the bottom surface of the flange and the nuts have a clearance space therebetween for any position of the nut along the thread length of the bolt.

9. A manway cover assembly comprising:

a tank containing a pressurized gas and having a manway opening sized to permit personnel to pass therethrough, the manway opening including a flange having a bottom surface and including a plurality of flange bolt holes;

a body having a weight, supported by the flange, sized to cover the manway opening, and having a plurality of body bolt holes;

a plurality of bolts extending through both the plurality of body and flange bolt holes, the plurality of bolts having threads extending from a lower, threaded end of the bolt for a thread length, the bolts defining a substantially linear path;

a plurality of nuts for engaging said threads of the bolts;

the thread length being sized small enough so that when the body is positioned over the manway opening the bottom surface of the flange and the nuts have a clearance space therebetween for any position of the nut along the thread length of the bolt thereby allowing the body to lift from the flange at a predetermined pressure of the pressurized gas to provide pressure relief for the tank;

the body being restrained from movement in all directions except along the path and movement along the path being resisted by substantially only the weight of the body; and a guard extending downwardly from the body, the guard being disposed at a radially outward position relative to the plurality of bolts such that the guard circumferentially surrounds the plurality of bolts.

* * * * *